Feb. 13, 1934.  R. E. HALL ET AL  1,947,260
TANK GAUGE
Filed Dec. 2, 1929   2 Sheets-Sheet 1
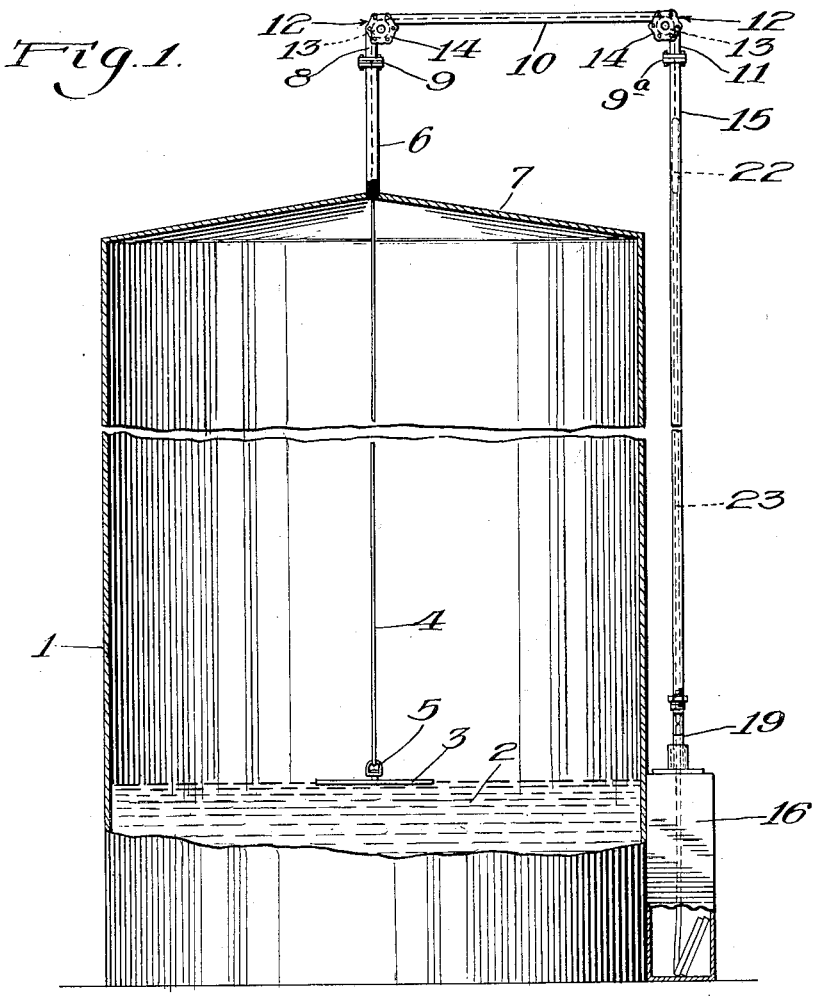
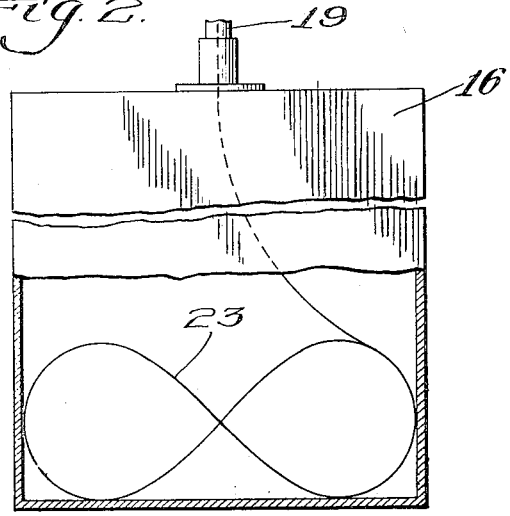
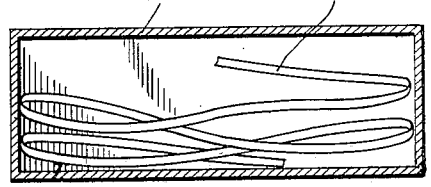
Inventors:
Ray E. Hall,
Clyde W. Hall.
By Wallace R. Lane
Atty.

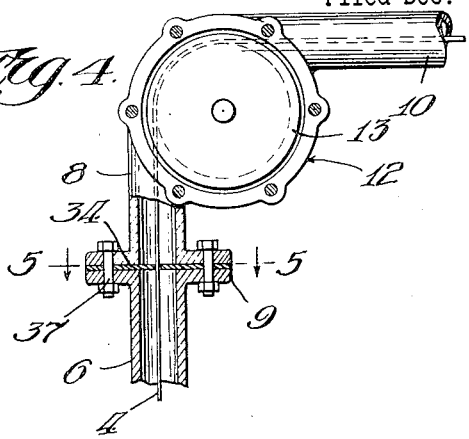
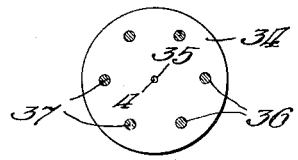
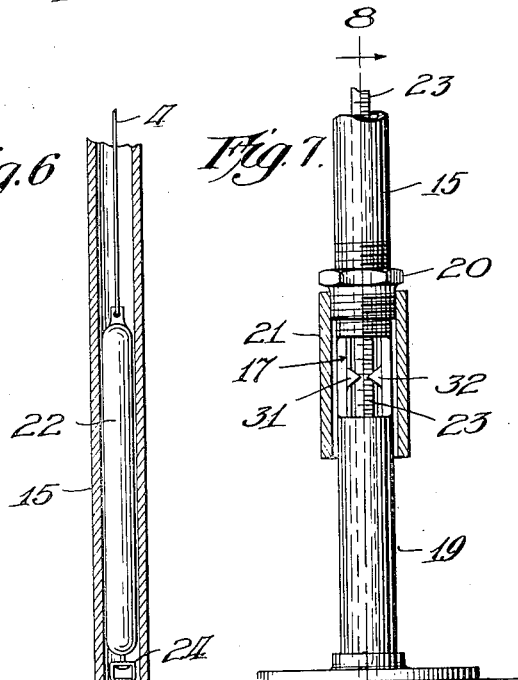
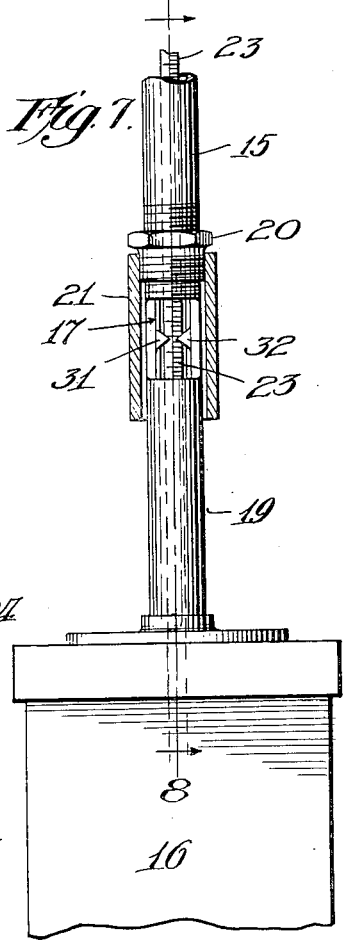
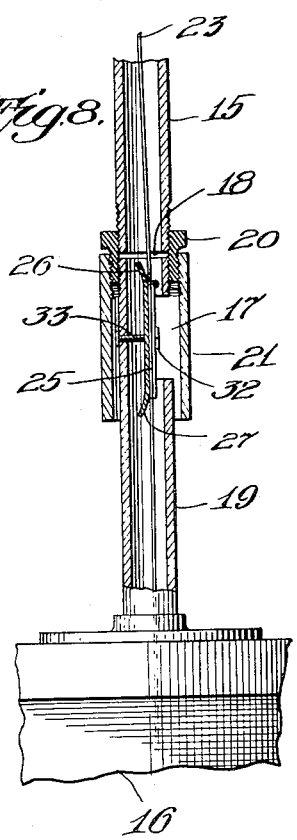
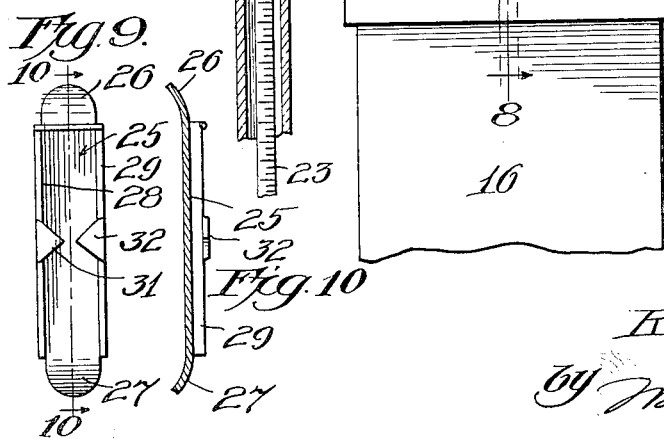

Patented Feb. 13, 1934

1,947,260

UNITED STATES PATENT OFFICE 1,947,260

TANK GAUGE

Ray E. Hall and Clide W. Hall, Webster City, Iowa, assignors to Hall Brothers Company, Webster City, Iowa, a firm composed of Ray E. Hall, Forest F. Hall, Clide W. Hall, and Rube McFerren Application December 2, 1929. Serial No. 410,978

10 Claims. (Cl. 73—82)

This invention relates to a gauge for ascertaining the depth of fluids in storage tanks, and more in particular to a gauge for ascertaining such depths when the fluid measured is of a volatile nature and necessarily must be stored in closed containers.

Among the objects of the present invention is to provide a gauge construction for measuring the depth of fluids in containers, tanks or the like, in which such construction is direct and positive in action.

A further object is to provide a gauge or measuring device in which a float is provided in the tank or container and a tape or indicator is attached thereto, such gauge or measuring device making full use of the natural characteristics of the tape or indicating means in that it tends to remain straight within its elastic limits. The natural characteristics of the tape are further made use of in the coiling of the tape in the form of a figure 8, which coils lie side by side in the bottom of the container.

Another object is to provide a measuring means which will remain straight and true regardless of the depth of the fluid in the container which is being measured.

A still further object is to provide a novel measuring or indicating means comprising a tape construction of steel or the like, which may be easily and readily read at a glance for ascertaining the amount of fluid in the container, and which requires no auxiliary take-up devices for the tape, thus eliminating a corresponding complication of parts.

Another object of the device is to provide a novel indicator which is provided with means for aligning the tape and keeping the same plumb.

Further objects are to provide a construction of maximum simplicity, efficiency, economy and ease of assembly and operation; and such further objects, advantages and capabilities as will later more fully appear and are inherently possessed thereby.

Our invention further resides in the combination, constructions and arrangements of parts illustrated in the accompanying drawings, and while we have shown therein a preferred embodiment, it is to be understood that the same is susceptible of modification and change, without departing from the spirit of our invention.

In the drawings:

Fig. 1 is a view in side elevation of a storage tank provided with our novel gauge construction, portions of the storage tank and container for housing the slack or unused tape being broken away to more clearly disclose the inner construction and the folding of the slack tape.

Fig. 2 is a fragmentary view of the container for intercepting and housing the tape, a portion of the container being shown in vertical cross section to more clearly disclose the position of the folded tape.

Fig. 3 is a view in horizontal cross section of the container.

Fig. 4 is a fragmentary view, part in side elevation and part in vertical cross section, disclosing the diaphragm or seal for preventing the escape of vapor from the tank when the same contains volatile fluids.

Fig. 5 is a top plan view of the diaphragm disclosed in Fig. 2.

Fig. 6 is a fragmentary view in vertical cross section taken through the tubular member housing the wire or cord to which is connected the weighted member and the tape or measuring instrument.

Fig. 7 is a fragmentary view in front elevation, with a portion in vertical cross section, of the indicating means for indicating the depth of fluid in the container.

Fig. 8 is a fragmentary view in vertical cross section taken on the line 8—8 of Fig. 7.

Fig. 9 is a view in front elevation of the indicator.

Fig. 10 is a view in vertical cross section taken on the line 10—10 of Fig. 9.

Referring more particularly to the disclosure in the drawings, the numeral 1 designates a storage tank or reservoir in which is stored a quantity of fluid 2. In order to accurately measure the quantity of fluid in the tank or reservoir, our invention comprehends the use of a float 3 of any desired material and shape, to which is attached a wire or cord 4. In the present disclosure, our invention is shown in connection with a tank or reservoir for some volatile fluid, which necessarily must be enclosed in a substantially air tight container, although it is to be understood that the invention is broader in scope and may be used for measuring practically any known fluid. The float 3 is provided with a swivel attachment 5 for attaching the wire, cord or connecting means 4 thereto.

A pipe or tubing 6 is connected to the top 7 of the storage tank or container, and to its upper end is connected a second tubing or pipe 8 by means of a union 9. A horizontal extension or pipe 10 may be made integral with the pipe or tubing 8 and a similar pipe or tubing 11, or these tubes or pipes may be made separate and connected together by means of a nipple, union or the like. At each end of the pipe 10 is provided an enlarged housing 12, 12, in which are mounted pulleys 13, 13. Each housing 12, 12 is preferably provided with a closure 14 for the assembly, repair or replacement of the pulleys. Connected to the extension or pipe 11 by means of a union 9a is provided an elongated tube or pipe 15 mounted above the upper end of a container 16.

A cut-out portion 17 is provided in a short pipe or tubing 19 adjacent the lower end 18 of the pipe or tubing 15. The joining ends of the pipes 15 and 19 are threaded and connected together by means of a coupling or nipple 20 provided with both external and internal threads, the external threads of the coupling or nipple 20 being adapted to threadingly engage a tubular cover 21 adapted to form a closure over the cut-out portion 17. The wire or connecting means 4 passes through the tubing or pipes over the pulleys 13, 13, and at its outer end is connected to a weight 22. A tape or measuring device 23 suitably marked to show the depth of fluid in the reservoir or container 1, is connected to the lower end of the weight 22 by means of a swivel joint 24. This tape passes through the pipes 15 and 19, and through an indicating means 25, the lower end of the tape or measuring device passing into the container or housing 16, where it folds as shown clearly in Figs. 1, 2 and 3, and since no tension means or weight is connected to the lower end of the tape, the same will loosely fold in the form of a figure 8, with no danger of entanglement.

The indicating device 25 comprises a strip or sheet of metal, curved at its opposite ends 26 and 27, and having its sides 28 and 29 bent upwardly to form a channel shaped member. Each side is provided with a pointer 31 and 32 for indicating on the tape or measuring device 23, the precise depth of fluid in the storage tank or reservoir. The indicator may be stamped or formed in any desired manner, and is mounted in the pipe 19 by means of a set screw 33. If desired the cut-out portion 17 is provided with a glass or other transparency (not shown) so as to prevent the entrance of foreign matter into the measuring device.

In order to prevent escape of any substantial amount of vapor from the reservoir or tank 1, the union 9 is provided with a diaphragm or metal disc 34 having a small opening 35 permitting the passage of the wire, or connecting means 4 therethrough. In order to provide a tight fit, this diaphragm or disc is provided with bolt holes 36, through which pass the bolts 37 of the union. However, if desired, this disc or diaphragm may be made smaller in diameter so that the bolt holes would be unnecessary, the same being clamped in position between the flanges of the union.

The tape or measuring instrument 23 is adapted to hang plumb in the pipe 15, passing through the channel shaped indicator 25 intermediate the points 31 and 32 and the back thereof. This construction allows for the proper alignment of the tape at all times. In order to prevent too great frictional contact or rubbing between the indicator and the tape, the ends 26 and 27 of the indicator are bent backwardly as shown more clearly in Figs. 6 and 8 of the drawings.

The diaphragm or seal 34 is preferably constructed of some thin non-corrodible metal. This seal not only provides a seal for preventing the escape of vapor, but also has the function of serving as a gasket for the union and helps in the alignment of the wire or cord 4. This seal requires no grease, oil or other packing, and owing to the thinness of the disc, it provides ample leeway for any misalignment of the wire or cord through the seal.

In the present construction, the weight or pull acting upon the float is at the upper end of the measuring tape and above the indicator. Thus, no strain is placed upon the tape and it will remain within its elastic limits. No auxiliary take-up devices are necessary for the tape, since the same hangs loosely. The slack which collects in the container or housing 16 has no tendency to twist or entwine. When the indicator is being used or read, the closure 21 is in the position shown in Fig. 1. When not in use, the same is in threaded engagement with the union or nipple 20, and when in this position, there is no danger of breakage to the transparency in the cut-out portion 17.

From the above description and the disclosure in the drawings, it will be readily seen that we have provided a new and novel construction of gauge, which is simple in operation, and which employs a minimum number of working parts.

Having thus disclosed the invention, we claim:

1. A gauge for measuring the depth of fluid in a storage container, comprising a float in said container, a wire connected at one end to said float, a weight connected to the other end of said wire, and a tape attached to said weight for indicating the depth of said fluid.

2. A gauge for measuring the depth of fluid in a storage tank, comprising a float in said tank, tubing leading from said tank, a wire connected at one end to said float and passing through said tubing, a weight at the other end of said wire, a tape connected to said weight, and indicating means for designating on said tape the depth of fluid in said tank.

3. A gauge for measuring the depth of volatile fluid in a storage tank, comprising a float in said tank, a wire connected at one end to said float, a weighted member connected to the other end of said wire, a tape connected to said weight, tubing leading from said tank and enclosing said wire, weight and tape, and an indicator mounted in said tubing for indicating on said tape the depth of fluid in said tank.

4. A gauge for measuring the depth of volatile fluid in a storage tank, comprising a float in said tank, a wire connected to said float, a weighted member connected at its one end to the other end of said wire, a tape connected to the other end of said weight, tubing leading from said tank and enclosing said wire, weight and tape, a pulley in said tubing over which said wire passes, a diaphragm in said tubing and provided with an opening through which the wire passes, said diaphragm providing a seal for preventing the escape of vapor from said tank, and an indicator adjacent said tape for indicating the depth of fluid in said tank.

5. A gauge for measuring the depth of fluid in a container, comprising a float in said container, a weight, means for connecting said float and weight, and a measuring device provided with designated markings hung from said weight.

6. A gauge for measuring the depth of fluid in a container, comprising a float in said container, a weight, means for connecting said float and weight whereby the weight is movable with said float, and a tape provided with designated markings hung from said weight.

7. A gauge for measuring the depth of fluid in a container, comprising a float in said container, a weight, means for connecting said float and weight whereby the weight is movable with said float, a tape provided with designated markings hung from said weight, and a container for receiving the slack tape.

8. A gauge for measuring the depth of fluid in a tank, comprising a float in said tank, a container, a tubing leading from said tank to said container, a weight in said tubing, means for connecting said weight with said float, a tape provided with designated markings hung from said weight and having its slack portion within said container, and an indicating means in said tubing.

9. A gauge for measuring the depth of fluid in a tank, comprising a float in said tank, a container, a tubing leading from said tank and connected to said container, a weight in said tubing connected with said float, a tape provided with designated markings hung from said weight and having its slack portion within said container, said tubing having an opening adjacent said container, and indicating means in said tubing opposite said opening for indicating on said tape the depth of fluid in said tank.

10. A gauge for measuring the depth of fluid in a tank, comprising a float in said tank, a container, a tubing leading from said tank and connected to said container, a weight in said tubing connected with said float, a tape provided with designated markings hung from said weight and having its slack portion within said container, said tubing having an opening adjacent said container, indicating means in said tubing opposite said opening for indicating on said tape the depth of fluid in said tank, and a rotatable tubular closure member for said opening.

RAY E. HALL.
CLIDE W. HALL.